United States Patent [19]

Morrill

[11] Patent Number: 5,260,620

[45] Date of Patent: Nov. 9, 1993

[54] ASYNCHRONOUS INDUCTION MOTOR

[76] Inventor: Giles W. Morrill, 3 Matson Ct., Johnson City, Tenn. 37604

[21] Appl. No.: 848,712

[22] Filed: Mar. 9, 1992

[51] Int. Cl.⁵ .............................................. H02K 1/12
[52] U.S. Cl. ...................................... 310/185; 310/42; 310/166; 310/184; 310/211; 310/254
[58] Field of Search .............. 310/166, 211, 179, 180, 310/184, 68 R, 185, 216, 254, 192, 185, 187, 193, 42

[56] References Cited

U.S. PATENT DOCUMENTS

| | | | |
|---|---|---|---|
| 1,761,836 | 6/1930 | MacFarlane | 310/216 UX |
| 2,433,390 | 12/1947 | Packer | 310/254 UX |
| 2,773,999 | 12/1956 | Morrill . | |
| 3,274,412 | 9/1966 | Fisher | 310/179 UX |
| 3,441,760 | 4/1969 | Collens | 310/187 UX |
| 3,445,702 | 5/1969 | Silva | 310/254 UX |
| 3,466,480 | 9/1969 | Bunner | 310/216 UX |
| 3,500,092 | 3/1970 | Heilmann et al. . | |
| 3,809,938 | 5/1974 | Sjoberg | 310/254 UX |
| 4,196,366 | 4/1980 | Schiethart . | |
| 4,209,720 | 6/1980 | Ducrot | 310/179 |
| 4,371,802 | 2/1983 | Morrill | 310/166 |
| 4,649,305 | 3/1987 | Morrill . | |
| 4,977,344 | 12/1990 | Obradovic . | |
| 5,045,742 | 9/1991 | Armstrong | 310/254 |

Primary Examiner—R. Skudy
Attorney, Agent, or Firm—George Pappas

[57] ABSTRACT

An asynchronous salient pole induction motor having a stator core with equally-spaced teeth with inner ends having equal angular extent and defining a bore whereat a squirrel cage rotor is provided. A main field winding includes serially connected coils embracing alternate stator teeth and connected across a single phase source of alternating current. An auxiliary field winding includes serially connected coils embracing consecutive teeth intermediate the teeth having the main winding coils thereon. The auxiliary winding coils are phase displaced from the main winding coils. Each of the teeth faces at their inner ends are shaped for increasing the air gaps on both sides of the center line longitudinal plane of each tooth thereby increasing the magnetic reluctance between each of the teeth and the rotor on both sides of the center line plane. The laminations are first punched with circular shaped teeth inner ends and thereafter are punched to remove a cut-away portion from the teeth inner ends substantially near the tips of the teeth furthest away from the center line plane.

6 Claims, 3 Drawing Sheets

ASYNCHRONOUS INDUCTION MOTOR

TECHNICAL FIELD

The present invention relates to the technical field of asynchronous induction motors. More specifically, the present invention relates to an improvement in an asynchronous induction motor having a stator with a plurality of salient poles whereupon individual coils are located for creating the necessary flux to drive the rotor.

BACKGROUND OF THE INVENTION

The present invention is an improvement to the half-pitch capacitor induction motor as described in Morrill, U.S. Pat. No. 4,371,802 issued on Feb. 1, 1983. The motor described in that patent includes a stator core member having equally spaced teeth extending inwardly and forming a bore whereat the rotor is received. The number of teeth are equal in number to twice the number of motor poles. The main field winding includes serially connected coils embracing alternate consecutive stator teeth and connected across a single phase source of alternating current. An auxiliary field winding includes serially connected coils embracing consecutive stator teeth intermediate the main winding coil teeth. The auxiliary winding coils are connected to the single phase source of alternating current in series with a phase displacing capacitor. Morrill U.S. Pat. No. 4,371,802 taught that if the turns and wire size of the main and auxiliary windings have balanced volts per turn conditions and identical ampere turns and, if the value of the capacitor in series with the auxiliary winding coils is chosen such that the main and auxiliary windings are in exact time quadrature at the operating speed, then the third harmonic in the forward direction cancels, the fifth harmonic is reduced and the seventh and ninth harmonics do not appear to or do not couple the rotor.

In normal production environments, the balanced conditions of Morrill U.S. Pat. No. 4,371,802 are substantially difficult to achieve and increase labor and production time thereby increasing the overall product cost. Furthermore, the operating speed varies over a range of torque and, therefore, cannot be predicted exactly so that the motor can be produced for specific desired applications. Accordingly, although the winding of wire on the salient poles decreases cost of production, for example, compared to a distributed wound motor, the requirement of balancing the above-described conditions substantially detract from the actual usefulness of such a motor.

SUMMARY OF THE INVENTION

It is the principle object of the present invention to overcome the above-discussed disadvantages associated with prior asynchronous salient pole induction motors.

The present invention was conceived by first determining and realizing that the air gap flux density wave crossing the air gap between the rotor and each respective stator tooth was substantially square. It was realized that the square-shaped wave of flux is experienced on the rotor quite similar to a plurality of pistons hitting the rotor instantaneously. In essence, the rotor experiences the various harmonics that make up a square wave in addition to the fundamental wave of flux and because the harmonics are at different frequencies from that of the fundamental, torque, speed and efficiency are limited and/or lost. The third, fifth, seventh, and ninth harmonics, in essence, fight the fundamental thereby both decreasing efficiency and making its application range unpredictable.

The present invention overcomes the disadvantages associated with the prior asynchronous salient pole induction motors by increasing the air gap between the rotor and each stator tooth on both sides of a central line longitudinal plane of each tooth. As the air gap increases toward the tooth tips and away from the center line longitudinal plane, the magnetic reluctance also increases thereby decreasing the magnetic flux traveling thereacross and between the stator tooth and rotor. Accordingly, the flux density between each tooth and the rotor is more closely akin to the fundamental sinusoidal wave such as, for example, as provided by distributed wound motors.

Preferably, where the stator teeth are defined by 180 electrical degrees with the center line longitudinal plane being at 0 electrical degrees, the teeth inner ends are shaped for increasing the air gaps starting at 40 to 45 electrical degrees on either side of the center line plane and extending away therefrom. More preferably, the teeth inner ends are shaped for increasing the air gaps starting at an angle on either side of the center line plane defined by:

$$\cos \Theta_s = \tfrac{1}{4}\pi \sin \Theta_2$$

where:

$\Theta_s$ = angle to start air gap increase in electrical degrees; and, $\Theta_2 = \tfrac{1}{2}$ the electrical pitch of the winding in electrical degrees.

Additionally, the teeth inner ends are preferably shaped for providing increasing air gaps equal to a length $\delta \pm 20\%$ of $\delta$ according to:

$$\delta = \delta_n \frac{\text{AIR GAP FLUX}}{a_1 \cos\Theta}$$

where:

$\delta$ = length of air gap at a distance $\Theta$ from the teeth center line plane;

$\delta_n$ = normal air gap equal to $\tfrac{1}{2}$ the difference between the teeth inner ends circular shape diameter and the rotor diameter; and, $a_1$ = amplitude of desired flux wave applied to rotor.

The stator core is preferably made of a plurality of bound laminations. The stator teeth inner ends are chamfered on both sides of the center line longitudinal plane thereby shaping the teeth inner ends for increasing the air gaps on both sides of the center line plane. More preferably, for decreasing production time, the laminations are first punched with circular shaped teeth inner ends for forming a uniform air gap and, thereafter, are punched to remove a cut-away portion from the teeth inner ends substantially near the tips of the teeth furthest away from the center line plane. The cut-away portion closely approximates the desired tooth shape for providing the desired air gap and, thereby, creating the desired fundamental wave flux density between the teeth and rotor.

BRIEF DESCRIPTION OF THE DRAWINGS

The above-mentioned and other features and objects of this invention and the manner of obtaining them will become more apparent and the invention itself will be better understood by reference to the following description of an embodiment of the invention taken in conjunction with the accompanying drawings wherein.

Corresponding reference characters indicate corresponding parts throughout the several views of the drawings.

Figure 1:
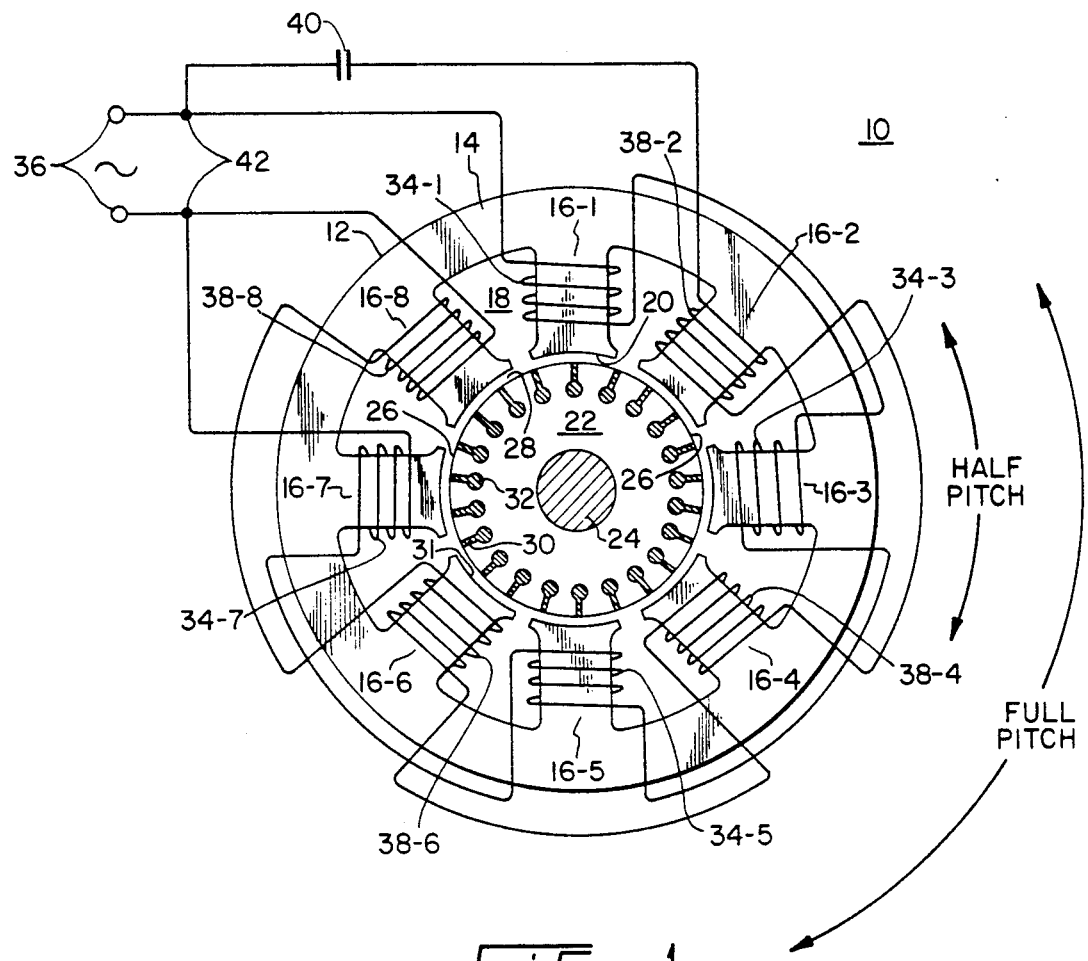
FIG. 1 is a cross-sectional side diagrammatic view of a prior art asynchronous induction motor improved by the present invention.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENT

Referring to the figures of the drawings, there is shown an asynchronous induction motor generally indicated as 10 and having a laminated stator core member 12. Stator core member 12 includes a generally cylindrically-shaped yoke portion 14 and equally angularly spaced radially inwardly extending teeth 16 respectively defining winding slots 18 therebetween. Teeth 16 have inner teeth ends 20 which define a bore for receiving laminated rotor member 22 on shaft 24. Outer periphery 26 of rotor member 22 defines radial air gaps 28 with inner teeth ends 20 of stator teeth 16. Outer periphery 26 also has generally axially extending slots 30 formed therein for a squirrel cage winding 32 therein in a known and customary fashion. The number of stator teeth 16 is twice the number of poles of motor 10 and, thus, in the embodiment shown in the figures, there are four poles and a total of eight stator teeth 16. The inner teeth ends 20 of teeth 16 have substantially equal angular extent. That is, the tooth face 31 of each tooth 16 embraces outer periphery 26 of rotor member 22 with the same span as every other tooth. As more fully described hereinbelow, each of said tooth faces 31 of each of said teeth 16 have substantially the same curvature and face shape.

Similar to the half-pitch capacitor induction motor disclosed in U.S. Pat. No. 4,371,802 to Wayne J. Morrill, the full text and teachings of which are expressly incorporated herein by reference, a main field winding is provided including serially connected coils 34-1, 34-3, 34-5, and 34-7 respectively embracing teeth 16-1, 16-3, 16-5, and 16-7. There are the same number of coils 34-1, 34-3, 39-5 and 39-7 as the number of poles. The main field winding coils 34-1, 34-3, 34-5, and 34-7 are serially connected across single-phase alternating current source 36 such as 120 volts, 60 Hz.

An auxiliary field winding is provided and includes coils 38-2, 38-4, 38-6 and 38-8 respectively embracing consecutive alternate teeth 16-2, 16-4, 16-6, and 16-8 intermediate the teeth upon which the main winding coils 34-1, 34-3, 34-5 and, are wound. Auxiliary field winding coils 38-2, 38-4, 38-6, and 38-8 are serially connected with phase shifting capacitor 40 across the serially connected main field winding coils 34-1, 34-3, 34-5 and 34-7 as indicated at 42. It will be understood herein that phase shifting capacitor 40 is only one means for phase displacing the main field winding from the auxiliary field winding and, that other equivalent structure is contemplated as part of this means, such as, for example, by varying the number of turns and changing inductance, the size of the wire, and locating capacitors in different parts of the main and auxiliary field windings and varying capacitance. Accordingly, it should be understood that various components of the motor structure can be varied for providing the necessary means for phase displacing the main field winding from the auxiliary field winding. As can also be appreciated, two-phase alternating current could be utilized connecting each of the main and auxiliary windings to the two different phases and the same is also contemplated herein as part of the means for phase displacing.

As indicated in FIG. 1, full pitch is the angular extent of one pole of motor 10, i.e., 90 degrees mechanical in the illustrated four pole embodiment, and half-pitch is the angular extent of one-half of one pole i.e., 45 degrees mechanical in the illustrated four pole embodiment. As is shown, the magnetic flux crossing air gap 28 into or out of respective teeth ends 20 has a substantially half-pitch span.

As more fully described hereinbelow, teeth ends 20 are shaped in a manner whereby air gaps 28 on both sides of a central line longitudinal plane 50 increase toward the teeth tips 52 thereby increasing the magnetic reluctance between each of the teeth and the rotor on both sides of center line plane 50 towards teeth tips 52.

Wayne J. Morrill, in U.S. Pat. No. 4,371,802 disclosed that if the turns and wire size of the main and auxiliary windings have balanced volts per turn conditions and identical ampere turns and if the value of the capacitor is chosen such that these main and auxiliary windings are in exact time quadrature at the operating speed then the third harmonics in the forward direction cancel and the remaining third harmonic appears in the backward direction which is not harmful in a fan motor. The fifth harmonic is reduced and the seventh and ninth harmonics do not seem to appear or do not couple to the rotor. These balanced conditions are difficult to achieve in a production environment and often involve increased labor and or processing thereby increasing cost. Likewise, the operating speed of a motor in application often varies within a range and can not be predicted exactly.

Figure 4:
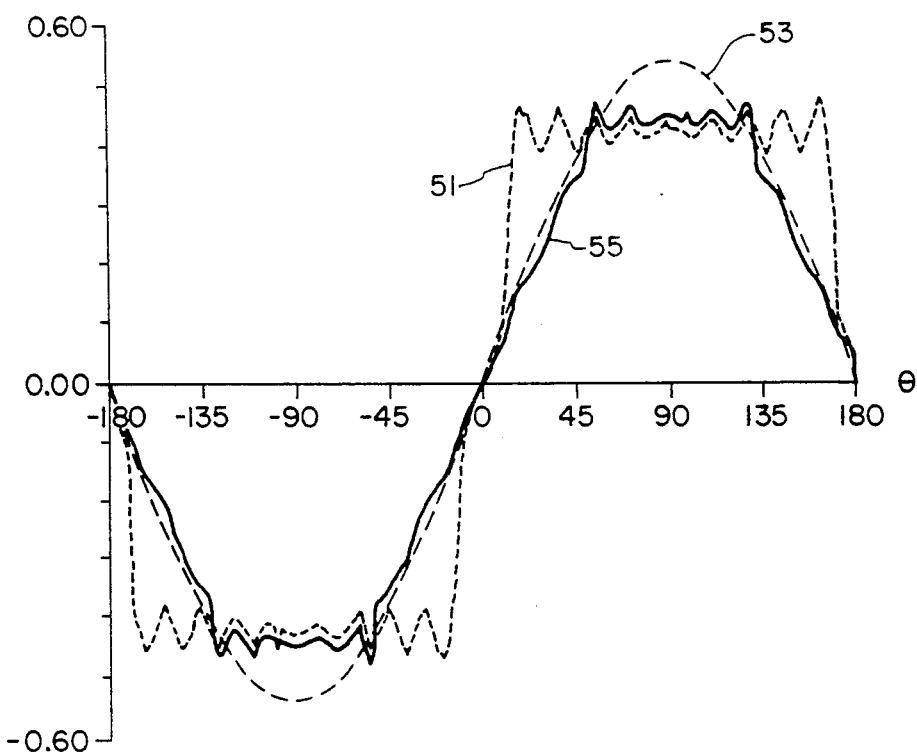
FIG. 4 is a flux density diagram showing the most ideal desired flux air gap flux density along with prior salient pole motor flux density and the flux density wave accomplished by the present invention; and, FIG. 5 is a blown-up diagrammatic view of a single stator tooth shaped according to the present invention.

Referring now to FIG. 4, there are shown experimental results of the half-pitch induction motor air gap flux density. The air gap flux density of the motor disclosed in U.S. Pat. No. 4,371,802 is substantially a square wave shape as shown in the small dashed line 51. Ideally, however, the flux traveling across the air gaps and between each tooth inner end 20 should be sinusoidal as shown in the larger dashed line 53. Ideally, if the desired sinusoidal flux density represented by larger dashed line 53 is applied to the rotor, inductance would be substantially uniform on the rotor squirrel cage and available torque per given power input would increase along with efficiency. Where the tooth ends 20 create a uniform and constant air gap 28 with the rotor 22 a square wave is experienced by the rotor as indicated by line 51, and the various harmonic waves which, in essence make up the square wave, are also experienced by the rotor. However, the various harmonic flux waves are at different frequencies thereby introducing detrimental magnetic flux into the rotor and, thus, also arbitrary torque outputs at any given speed. This problem with respect to harmonic wave flux densities is also described in Wayne J. Morrill, U.S. Pat. No. 4,371,082.

By shaping the tooth faces 31 of teeth ends 20 and increasing the air gaps 28 between the rotor 22 and teeth 16 toward teeth tips 52, the reluctance thereat is increased and the flux density experienced by the rotor is changed advantageously as shown in FIG. 4 in the solid line 55. As shown by the experimental data, the flux density wave represented by solid line 55 appears to be closer to the fundamental sinusoidal wave represented by laser dashed line 53. Indeed, by shaping the teeth inner teeth ends 20 as described herein, efficiencies have been seen to increase approximately 12.04 percent from 43.2 percent to 48.4 percent.

Figure 2:
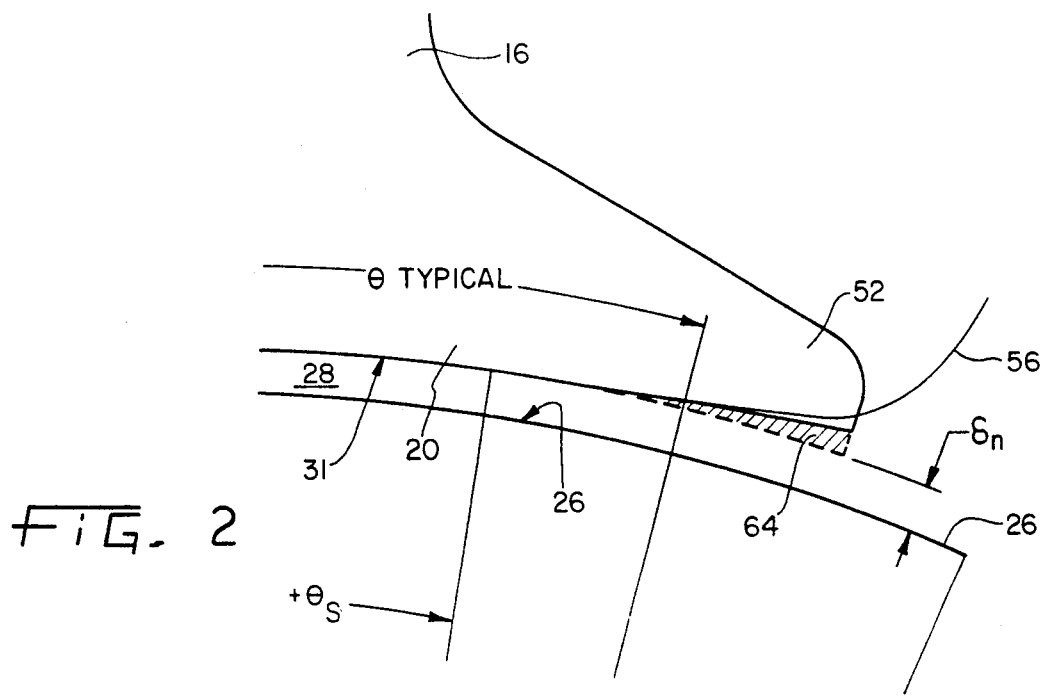
FIG. 2 is a blown-up diagrammatic cross-sectional view of a tooth inner end tip according to the present invention.
Figure 3:
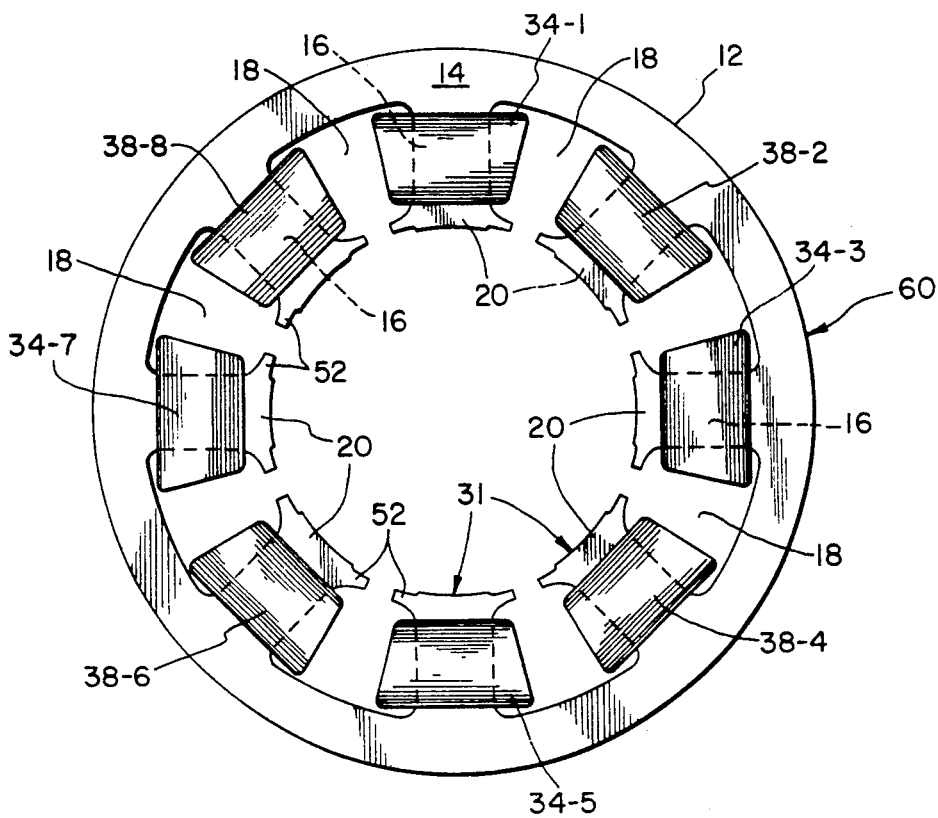
FIG. 3 is a front elevational view of the stator core according to the present invention.
Figure 5:
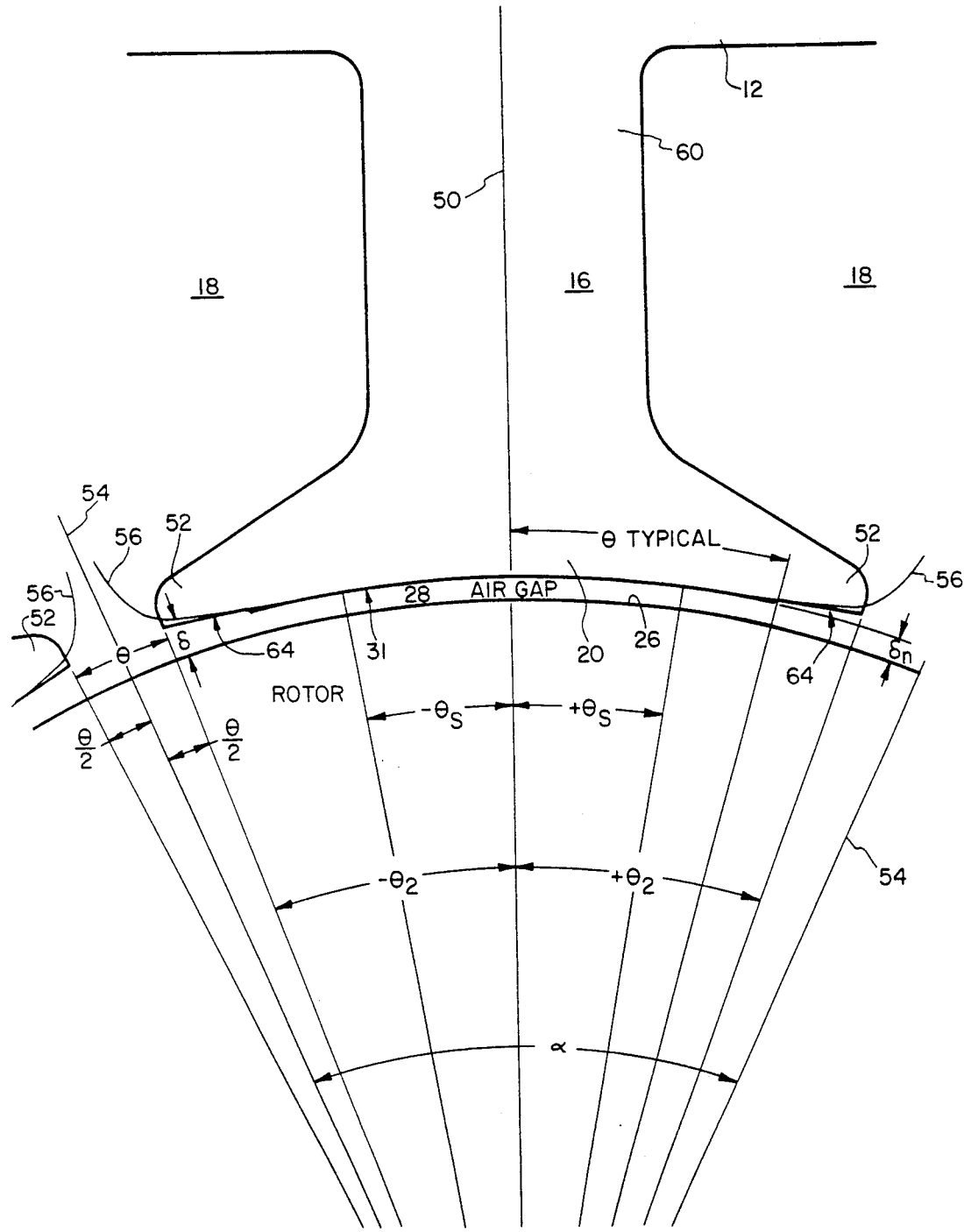

Referring now to FIGS. 2 and 5, a tooth 16 is shown without a coil wound thereon and with the winding slots 18 to the left and to the right of the center line longitudinal plane 50. In FIG. 5, the teeth are defined by a total of 180 electrical degrees shown as $\alpha$. The center line longitudinal plane 50 is at 0 electrical degrees and the midpoint between each successive tooth 16 would, therefore, be at $-90$ degrees and $+90$ degrees electrical. The distance between each successive tooth is shown as an electrical degree distance of $\Phi$. The electrical degree midpoint line 54 is located at $+90$ degrees and $-90$ degrees at a distance $\Phi/2$ from the teeth tips 52.

The normal air gap $\delta_n$ is equal to, as described hereinabove, one-half the difference between the teeth inner ends 20 diameter and the rotor diameter. In the preferred embodiment, the teeth faces 31 of inner teeth ends 20 are shaped as indicated by line 56 for increasing the air gap from the center line longitudinal lane 50 toward tips 52. Preferably, the air gap is increased starting at $-\Theta_s$ and $+\Theta_s$ where $\Theta_s$ is equal to 42.52 electrical degrees. That is, $\Theta_s$ is calculated to be most preferred at 42.52 electrical degrees on either side of center longitudinal plane 50. Empirically, this angle would be between 40 and 45 electrical degrees on either side of the center line longitudinal plane 50.

The most preferred starting point for increasing the air gap starts at an angle $\Theta_s$ and extends on either side of the center line longitudinal plane 50 and is defined by:

$$\cos \Theta_s = \tfrac{1}{4}\pi \sin \Theta_2$$

wherein:

$\Theta_s$ = angle to start air gap increase in electrical degrees; and, $\Theta_2 = \tfrac{1}{2}$ the electrical pitch of the winding in electrical degrees.

The desired air gap flux density is best achieved by beginning increasing the air gap at $\pm\Theta_s$ and increasing to a total length (width) of air gap equal to a length $\delta$ as defined by line 56. The preferred air gap length $\delta$ is calculated according to:

$$\delta = \delta_n \frac{\text{AIR GAP FLUX}}{a_1 \cos\Theta}$$

where:

$\delta$ = length of air gap at a distance $\Theta$ from the teeth center line plane;

$\delta_n$ = normal air gap equal to one-half the difference between the teeth inner ends circular shaped diameter and the rotor diameter; and, $a_1$ = amplitude of desired flux wave applied to rotor.

Empirically, the air gap length $\delta$ will range $\pm 20\%$ of $\delta$ at any given distance $\Theta$ from plane 50.

The stator core 12 is made of a plurality of bound laminations 60. The laminations are bound together in a known and customary manner. Each of the laminations 60 are stamped from flat stock of magnetically permeable material prior to being assembled together.

As shown in FIG. 2, the laminations 60 are stamped with a cut-away portion 64 (hatched) for decreasing the amount of material near tips 52. It should be recognized by those skilled in the art that if the laminations were initially stamped with circular shaped teeth inner ends for forming a uniform air gap length $\delta_n$, such as when rotor laminations are simultaneously punched from the same stock, and thereafter are punched with a die that followed the desired shape as indicated by line 56, the cutting edge of the die at the points $\pm\Theta_s$ would be infinitesimally thin and would therefor have a greatly reduced useful life. Further, the infinitesimally thin sliver punched by such a die would also become caught between the die parts and further reduce the useful life of the die. For these reasons, the cut-away portion 64 was proportioned to begin along the desired shape of line 56, but at an angle of $\pm\Theta$ that would allow a more rounded cutting edge on the stamping die consistent with long die life. As shown the cut-away portion of shape 64 begins at an angle $\pm\Theta$ of between 49 and 61 electrical degrees and extends linearly toward tip 52 to a point empirically determined to be 80% of the most desired shape as defined by line 56.

Thereafter, if the final shape is required to be closer to the desired line 56, the face 31 of teeth ends 20 can be chamfered such as by grinding starting at $\Theta_s$. As can be appreciated, by initially stamping the laminations 60 with a cut-away portion 64, the chamfering or grinding process is aided by decreasing the required production time and, thereby also decreasing production costs.

It has, however, been demonstrated by experiment that, just as the cut-away portion 64 mechanically approximating the desired shape 56 made the chamfering process easier, the same cut-away portion proportioned as described, magnetically approximated the desired shape shown by line 56 to the extent that the air gap flux was shaped substantially as desired and shown in FIG. 4 as solid line 55 and further chamfering of the teeth tip 52 was not always necessary.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In a single-phase asynchronous induction motor including a stator core member having a plurality of substantially equally angularly-spaced, radially inwardly extending teeth respectively defining winding slots therebetween, said teeth having inner ends defined a bore, a rotor member in said bore having a diameter and a peripheral surface defining air gaps with said ends of said teeth and having generally axially extending slots formed therein, said teeth inner ends having a circular shape with a diameter greater than the rotor member diameter thereby forming said air gaps, a squirrel cage winding in said rotor member slots extending between ends of said rotor member, a main field winding on said stator core member, said main field winding forming a predetermined even number of magnetic poles, an auxiliary field winding on said stator core member mechanically angularly displaced from said main field winding and forming the same number of magnetic poles as said main field winding, said teeth being equal in number to twice the number of said poles, said main field winding comprising a plurality of coils equal in number to the number of said poles, said main field winding coils respectively embracing alternate consecutive ones of said teeth, said auxiliary field winding comprising a plurality of coils equal in number to the number of said poles, said auxiliary field winding coils respectively embracing consecutive alternate teeth respectively intermediate said main field winding coils, there being one coil only on each said tooth thereby providing a half-pitch winding for said motor the improvement comprising:

means for phase displacing said main field winding from said auxiliary field winding and wherein each of said teeth have substantially equal angularly extent and each of said teeth inner ends are shaped for increasing said air gaps on both sides of a center line longitudinal plane of each of said teeth and increasing magnetic reluctance between each of said teeth and the rotor on both sides of said center line longitudinal plane; and wherein each of said teeth are defined by 180 electrical degrees with said center line longitudinal plane being at 0 electrical degrees, said teeth inner ends shaped for increasing said air gaps starting at 40 to 45 electrical degrees on either side of said center line longitudinal plane and extending away therefrom.

2. In a single-phase asynchronous induction motor including a stator core member asynchronous induction motor including a stator core member having a plurality of substantially equally angularly-spaced, radially inwardly extending teeth respectively defining winding slots therebetween, said teeth having inner ends defining a bore, a rotor member in said bore having a diameter and a peripheral surface defining air gaps with said ends of said teeth and having generally axially extending slots formed therein, said teeth inner ends having a circular shape with a diameter greater than the rotor number diameter thereby forming said air gaps, a squirrel cage winding in said rotor member slots extending between ends of said rotor member a main field winding on said stator core member, said main field winding forming a predetermined even number of magnetic poles, an auxiliary field winding on said stator core member mechnically angularly displaced from said main field winding and forming the same number of magnetic poles as said main field winding, said teeth being equal in number to twice the number of said poles, said main field winding comprising a plurality of coils equal in number to the number of said poles, said' main field winding coils respectively embracing alternate consecutive ones of said teeth, said auxiliary field winding comprising a plurality of coils equal in number to the number of said poles, said auxiliary field winding coils respectively embracing consecutive alternate teeth respectively intermediate said main field winding coils, there being one coil only one each said tooth thereby providing a half-pitch winding for said motor the improvement comprising:

means for phase displacing said main field winding from said auxiliary field winding and wherein each of said teeth have substantially equal angular extent and each of said teeth inner ends are shaped for increasing said air gaps on both sides of a center line longitudinal plane of each of said teeth and increasing magnetic reluctance between each of said teeth and the rotor on both sides of said center line longitudinal plane; and, wherein each of said teeth are defined by 180 electrical degrees with said center line longitudinal plane being at 0 electrical degrees, said teeth inner ends shaped for increasing said air gaps starting at an angle on either side of said center line longitudinal plane defined by:

$$\cos \Theta_s = \tfrac{1}{4}\pi \sin \Theta_2$$

where:

$\Theta_s$ = angle to start air gap increase in electrical degrees; and, $\Theta_2 = \tfrac{1}{2}$ the electrical pitch of the winding in electrical degrees.

3. The motor of claim 2 wherein said teeth inner ends are shaped for providing air gaps equal to a length $\delta \pm 20\%$ of said $\delta$ according to:

$$\delta = \delta_n \frac{\text{AIR GAP FLUX}}{a_1 \cos\Theta},$$

where:

$\delta$ = length of air gap at a distance $\Theta$ from the teeth center line longitudinal plane;

$\delta_n$ = normal air gap equal to $\tfrac{1}{2}$ the difference between said teeth inner ends circular shape diameter and the rotor member diameter; and, $a_1$ = amplitude of desired flux wave applied to rotor member.

4. In a single-phase asynchronous induction motor including a stator core member having a plurality of substantially equally angularly-spaced, radially inwardly extending teeth respectively defining winding slots therebetween, said teeth having inner ends defining a bore, a rotor member in said bore having a diameter and a peripheral surface defining air gaps with said ends of said teeth and having generally axially extending slots formed therein, said teeth inner ends having a circular shape with a diameter greater than the rotor member diameter thereby forming said air gaps, a squirrel cage winding in said rotor member slots extending between ends of said rotor member, a main field winding on said stator core member, said main field winding forming a predetermined even number of magnetic poles, an auxiliary field winding on said stator core member mechanically angularly displaced from said main field winding and forming the same number of magnetic poles as said main field winding, said teeth being equal in number to twice the number of said poles, said main field winding comprising a plurality of coils equal in number to the number of said poles, said main field winding coils respectively embracing alternate consecutive ones of said teeth, said auxiliary field winding comprising a plurality of coils equal in number to the number of said poles, said auxiliary field winding coils respectively embracing consecutive alternate teeth respectively intermediate said main field winding coils, there being one coil only on each said tooth thereby providing a half-pitch winding for said motor the improvement comprising:

means for phase displacing said main field winding from said auxiliary field winding and wherein each of said teeth have substantially equal angular extent and each of said teeth inner ends are shaped for increasing said air gaps on both sides of a center line longitudinal plane of each of said teeth and increasing magnetic reluctance between each of said teeth and the rotor on both sides of said center line longitudinal plane; and, wherein each of said teeth are defined by 180 electrical degrees with said center line longitudinal plane being at 0 electrical degrees, and wherein said teeth inner ends are shaped for providing increasing air gaps equal to a length $\delta \pm 20\%$ of said $\delta$ according to:

$$\delta = \delta_n \frac{\text{AIR GAP FLUX}}{a_1 \cos\Theta}$$

where:
$\delta$ = length of air gap at a distance $\theta$ from the teeth center line longitudinal plane;
$\delta_n$ = normal air gap equal to $\frac{1}{2}$ the difference between said teeth inner ends circular shape diameter and the rotor diameter; and,
$a_1$ = amplitude of desired flux wave applied to rotor.

5. In a single-phase asynchronous induction motor including a stator core member having a plurality of substantially equally angularly-spaced, radially inwardly extending teeth respectively defining winding slots therebetween, said teeth having inner ends defining a bore, a rotor member in said bore having a diameter and a peripheral surface defining air gaps with said ends of said teeth and having generally axially extending slots formed therein, said teeth inner ends having a circular shape with a diameter greater than the rotor member diameter thereby forming said air gaps, a squirrel cage winding in said rotor member slots extending between ends of said rotor member, a main field winding on said stator core member, said main field winding forming a predetermined even number of magnetic poles, an auxiliary field winding on said stator core member mechanically angularly displaced from said main field winding and forming the same number of magnetic poles as said main field winding, said teeth being equal in number to twice the number of said poles, said main field winding comprising a plurality of coils equal in number to the number of said poles, said main field winding coils respectively embracing alternate consecutive ones of said teeth, said auxiliary field winding comprising a plurality of coils equal in number to the number of said poles, said auxiliary field winding coils respectively embracing consecutive alternate teeth respectively intermediate said main field winding coils, there being one coil only on each said tooth thereby providing a half-pitch winding for said motor the improvement comprising:

means for phase displacing said main field winding from said auxiliary field winding and wherein each of said teeth have substantially equal angular extent and each of said teeth inner ends are shaped for increasing said air gaps on both sides of a center line longitudinal plane of each of said teeth and increasing magnetic reluctance between each of said teeth and the rotor on both sides of said center line longitudinal plane; and, wherein the stator core is made of a plurality of bound laminations and wherein said teeth inner ends are chamfered on both sides of said center line longitudinal plane thereby shaping said teeth inner ends for increasing said air gaps on both sides of said center line longitudinal plane;

wherein said laminations are initially stamped with a cut-away portion from the teeth inner ends substantially near tips of said teeth furthest away from said center line longitudinal plane and, wherein each of said teeth are defined by 180 electrical degrees with said center line longitudinal plane being at 0 electrical degrees, and wherein said teeth inner ends are shaped for providing increasing air gaps equal to a length $\delta \pm 20\%$ of said $\delta$ according to:

$$\delta = \delta_n \frac{\text{AIR GAP FLUX}}{a_1 \cos\Theta}$$

where:
$\delta$ = length of air gap at distance from the teeth center line longitudinal plane;
$\delta_s$ = normal air gap equal to $\frac{1}{2}$ the difference between said teeth inner ends circular shape diameter and the rotor member diameter; and,
$a_1$ = amplitude of desired flux wave applied to rotor member.

6. In a single-phase asynchronous induction motor including a stator core member having a plurality of substantially equal angularly-spaced, radially inwardly extending teeth respectively defining winding slots therebetween, said teeth having inner ends defining a bore, a rotor member in said bore having a diameter and a peripheral surface defining air gaps with said ends of said teeth and having generally axially extending slots formed therein, said teeth inner ends having a circular shape with a diameter greater than the rotor member diameter thereby forming said air gaps, a squirrel cage winding in said rotor member slots extending between ends of said rotor member, a main field winding on said stator core member, said main field winding forming a predetermined even number of magnetic poles, an auxiliary field winding on said stator core member mechanically angularly displaced from said main field winding and forming the same number of magnetic poles as said main field winding, said teeth being equal in number to twice the number of said poles, said main field winding comprising a plurality of coils equal in number to the number of said poles, said main field winding coils respectively embracing alternate consecutive ones of said teeth, said auxiliary field winding comprising a plurality of coils equal in number to the number of said poles, said auxiliary field winding coils respectively embracing consecutive alternate teeth respectively intermediate said main field winding coils, there being one coil only on each said tooth thereby providing a half-pitch winding for said motor the improvement comprising:

means for phase displacing said main field winding from said auxiliary field winding and wherein each of said teeth have substantially equal angular extent and each of said teeth inner ends are shaped for increasing said air gaps on both sides of a center line longitudinal plane of each of said teeth and increasing magnetic reluctance between each of said teeth and the rotor on both sides of said center line longitudinal plane; and, wherein said stator core is made of a plurality of bound laminations, said laminations being made by first being punched with circular shaped teeth inner ends for forming a uniform air gap and second, being punched to remove a cut-away portion from the teeth inner ends substantially near tips of said teeth furthest away from said center line longitudinal plane and, wherein said air gap, after said first and second punching of said lamination, approximates length $\delta$ according to:

$$\delta = \delta_n \frac{\text{AIR GAP FLUX}}{a_1 \cos\Theta}$$

where each of said teeth are defined by 180 electrical degrees with the center line longitudinal plane being at 0 electrical degrees; and, wherein;

$\delta$ = length of air gap at a distance $\Theta$ form the teeth center line plane;

$\delta_n$ = normal air gap equal to $\frac{1}{2}$ the difference between said teeth inner ends circular shape diameter and the rotor member diameter; and, $a_1$ = amplitude of desired flux wave applied to rotor member.

* * * * *

UNITED STATES PATENT AND TRADEMARK OFFICE
CERTIFICATE OF CORRECTION

PATENT NO. : 5,260,620
DATED : Nov. 9, 1993
INVENTOR(S) : Giles W. Morrill

It is certified that error appears in the above-indentified patent and that said Letters Patent is hereby corrected as shown below:

Col. 3, line 60, change "39-5" to -- 34-5 --.

Col. 3, line 60, change "39-7" to -- 34-7 --.

Col. 3, line 68, after "and" insert -- 34-7 --.

Col. 5, line 37, change "lane" to --plane--.

Col. 5, line 41, after "center" insert --line--.

Claim 2, Col. 7, line 41, after "member" delete "asynchronous induction motor including a stator core member".

Claim 2, Col. 7, line 51, delete "number" and insert -- member--.

Signed and Sealed this

Twenty-fourth Day of May, 1994

BRUCE LEHMAN

Attest:

Attesting Officer

Commissioner of Patents and Trademarks